United States Patent
Yargeldi et al.

(10) Patent No.: US 12,498,623 B2
(45) Date of Patent: Dec. 16, 2025

(54) MICRO-LENS ARRAY PROJECTION DEVICE, LIGHTING DEVICE AND VEHICLE

(71) Applicant: MERCEDES-BENZ GROUP AG, Stuttgart (DE)

(72) Inventors: Sinan Yargeldi, Dettingen an der Erms (DE); Axel Mueller, Schorndorf (DE); Martin Borowski, Calw (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 364 days.

(21) Appl. No.: 18/276,908

(22) PCT Filed: Dec. 6, 2021

(86) PCT No.: PCT/EP2021/084352
§ 371 (c)(1),
(2) Date: Aug. 11, 2023

(87) PCT Pub. No.: WO2022/171328
PCT Pub. Date: Aug. 18, 2022

(65) Prior Publication Data
US 2024/0118597 A1    Apr. 11, 2024

(30) Foreign Application Priority Data
Feb. 12, 2021    (DE) ............. 10 2021 000 724.7

(51) Int. Cl.
*F21S 41/63*    (2018.01)
*F21S 41/13*    (2018.01)
(Continued)

(52) U.S. Cl.
CPC ............ *G03B 21/001* (2013.01); *F21S 41/13* (2018.01); *F21S 41/683* (2018.01); *G03B 21/208* (2013.01)

(58) Field of Classification Search
CPC .... G03B 21/001; F21S 41/265; F21S 41/143; F21S 41/153; F21S 41/645; F21S 41/63; F21S 41/635; F21S 41/683; F21S 41/25
See application file for complete search history.

(56) References Cited

U.S. PATENT DOCUMENTS 9,951,919 B2    4/2018    Bauer et al.
10,569,694 B2    2/2020    Gocke
(Continued)

FOREIGN PATENT DOCUMENTS

DE    102010043829 A1    5/2012
DE    102014219371 A1    3/2016
(Continued)

OTHER PUBLICATIONS

International Search Report and Written Opinion mailed Apr. 4, 2022 in related/corresponding International Application No. PCT/EP2021/084352.
(Continued)

*Primary Examiner* — Ryan D Howard
(74) *Attorney, Agent, or Firm* — PATENT PORTFOLIO BUILDERS PLLC

(57) ABSTRACT

A micro-lens array projection device has at least one light source, a field lens array, a projection lens array, and a pattern template arranged in a light beam path coming from the light source between the field lens array and the projection lens array for generating a light pattern from the light emitted by the light source. The pattern template is formed by a microslide array having at least two microslides. At least one microslide can be moved by at least one actuator in a plane located perpendicular to an optical axis between the field lens array and the projection lens array.

8 Claims, 2 Drawing Sheets

(51) Int. Cl.
  *F21S 41/683* (2018.01)
  *G03B 21/00* (2006.01)
  *G03B 21/20* (2006.01)

(56) References Cited

U.S. PATENT DOCUMENTS

| | | | |
|---|---|---|---|
| 10,960,814 | B2 | 3/2021 | Goeke et al. |
| 2016/0265733 | A1 | 9/2016 | Bauer et al. |
| 2020/0332977 | A1 | 10/2020 | Miedler et al. |

FOREIGN PATENT DOCUMENTS

| | | |
|---|---|---|
| DE | 102015206936 A1 | 10/2016 |
| DE | 102015008774 A1 | 1/2017 |
| DE | 102016122856 A1 | 5/2018 |
| DE | 102018116511 B3 | 7/2019 |
| DE | 102019006911 A1 | 8/2020 |
| DE | 102019209090 A1 | 12/2020 |
| EP | 3486555 A1 | 5/2019 |
| JP | 2005161977 A | 6/2005 |
| JP | 2013149443 A | 8/2013 |
| JP | 2016534503 A | 11/2016 |
| JP | 2017107242 A | 6/2017 |
| JP | 2018036225 A | 3/2018 |
| WO | 2015058227 A1 | 4/2015 |
| WO | 2016072483 A1 | 5/2016 |
| WO | 2016163293 A1 | 10/2016 |
| WO | 2017157623 A1 | 9/2017 |

OTHER PUBLICATIONS

Office Action created Oct. 28, 2021 in related/corresponding DE Application No. 10 2021 000 724.7.
Office Action dated Oct. 1, 2024 in related/corresponding JP Application No. 2023-548638.
Office Action dated Feb. 14, 2025 in related/corresponding KR Application No. 2023-7023786.

Detail A

MICRO-LENS ARRAY PROJECTION DEVICE, LIGHTING DEVICE AND VEHICLE

BACKGROUND AND SUMMARY OF THE INVENTION

Exemplary embodiments of the invention relate to a micro-lens array projection device, a lighting device, a vehicle, and the use of such a lighting device in an environment recording system of a vehicle to determine a road condition.

As digitalization increases, the degree of automation of vehicles is also increasing. Vehicles today thus have a wide range of driver assistance systems that support a person driving a vehicle in operating their vehicle and thus ensure increased comfort and/or increased safety in road traffic. Some of these driver assistance systems, such as an adaptive cruise control or a parking assistant, require environment information such as the presence of static and/or dynamic environment objects in the surrounding area of the vehicle and their relative spacing from the vehicle. Some driver assistance systems, e.g., an adaptive chassis, additionally require information about a condition of a road that will shortly be driven along by the vehicle.

Different sensor systems for monitoring the environment are known from the general prior art. Ultrasound sensors, radar sensors, camera systems having a mono or stereo camera and laser scanners such as lidars in particular are thus already tried and tested in the automotive sector. The quality of the calculation of depth information using stereo cameras is comparatively significantly dependent on a quality of an assignment algorithm for assigning image information between the two cameras used, however. Such a system can additionally only be reliably used in daylight and has a distance-dependent precision. Using dedicated "ground lidars" to record the road condition is out of the question for use in mass production due to high costs and a limited vertical angular resolution.

A further method for environment monitoring or acquiring depth information uses active triangulation and, in particular, allows the ground driven over by the vehicle to be sampled to analyze its quality. Uneven ground such as potholes, speed bumps or road limits such as curbs or a ditch running parallel to an A road can thus be detected particularly quickly and effectively. A projector casts a structured light pattern into the environment, in particular onto a road lying ahead of a vehicle in a direction of travel, wherein feature points of the light pattern reflected from the environment are recorded by a camera arranged on the vehicle. It is possible to determine spacing or acquire depth information while taking the so-called epipolar geometry into account. By spatially displacing a place of installation of the camera and of the projector on the vehicle, it is possible to recognize a shift of the feature points of the light pattern in camera images generated by the camera if the light pattern is distorted due to uneven points or environment objects. Depending on the extent to which the light pattern is distorted, depth information can then be calculated. Using a system based on active triangulation to acquire depth information allows usage even in darkness due to the active lighting of a scene.

DE 10 2015 008 774 A1 thus discloses a corresponding device and a corresponding method for recording a vehicle environment on the basis of active triangulation. A pixel headlight of the vehicle is here used as a projector. The pixel headlight can be a front headlight of the vehicle or a separate headlight. The pixel headlight projects the light pattern into the environment in such a short time frame that the light pattern cannot be perceived by a human. A camera recording the environment and the pixel headlight are synchronized with one another so that exactly one camera image of the environment is recorded if the pixel headlight casts the light pattern into the environment. As the light pattern is only briefly cast into the environment and a person driving the vehicle cannot perceive the light pattern, the method disclosed in the document can be particularly comfortably implemented. In particular, the person driving the vehicle thus remains undistracted. In addition to basic lighting, the pixel headlight can additionally cast the light pattern into the environment or briefly deactivate or at least dim the basic lighting while the light pattern is being emitted. The light pattern can for example comprise a line pattern, strip pattern, dot pattern, grid pattern, chessboard pattern, and/or a pseudo-random pattern. The pixel headlight is light/dark controlled such that when it emits the light pattern, a basic brightness of the basic lighting remains constant over time. Using the device disclosed in the document and the method, uneven roads, road limits, and environment objects can be detected and their position relative to the vehicle can be determined. To generate the light pattern, the device disclosed in the document uses a pixel headlight, which has a complex structure and is thus expensive.

Micro-lens array projectors, also described as multi-aperture projection displays, are additionally known from the general prior art, using which it is possible to emit a structured light pattern. For this purpose, an object structure is arranged in the beam path between a light source and a projection plane onto which the light pattern should be cast to structure the light. A field lens array and a projection lens array are further arranged in the beam path before or behind the object structure, using which it is possible to focus or bundle the light beams emitted by the light source in a targeted manner. One lens of the field lens array and of the projection lens array is respectively assigned to a sub-structure of the object structure. For example, such micro-lens array projectors are used to generate an aesthetic vehicle environment lighting. Using the miniaturized lens array, it is possible to generate comparatively high focus depth in comparison with other projection systems.

A lighting device for a motor vehicle having such a micro-lens array projector is for example known from DE 10 2014 219 371 A1. The document describes the use of light patterns cast in a vehicle environment using the lighting device as a parking assistant, spacing control assistant, and/or as a bottleneck traversal control assistant. A light pattern cast in the environment using the lighting device disclosed in the document is focused at a fixed spacing from the vehicle, whereby a display content comprised by the light pattern appears sharply in focus at a particular spacing between the vehicle and an object onto which the light pattern is cast. Now, if the vehicle drives towards an object, the display content appears sharply in focus when the vehicle reaches the determined spacing, whereby a person driving the vehicle of the vehicle is informed that the determined spacing between the vehicle and the object has been reached when the fixed spacing has been reached. Several light patterns can also be cast in the environment simultaneously with the lighting device, the light patterns respectively being focused on an individual focus plane, the focus planes having a spacing from the vehicle differing from one another. A particularly simple and cost-efficient device for informing the person driving the vehicle about a spacing between the vehicle and an environment object is thus created. No further displays for visualizing the spacing between the vehicle and the environment object are thus necessary. A multi-aperture projection display can also be integrated into at least one front headlight and/or a rear light of a vehicle.

DE 10 2015 206 936 A1 further discloses a method and a device for detecting obstacles in the path of a vehicle using active triangulation. In the document, an arrangement of a light source, a ruled grating, and a lens is used as a projector to generate the light pattern. The light source is, in particular, designed as a laser diode and is equipped to emit infra-red light. The ruled grating can be designed as a filter wheel that has a plurality of different ruled gratings for generating different line patterns. By rotating the filter wheel, the different ruled gratings can then be brought into a beam path between the light source and the lens. It can also be possible to pivot the arrangement of the light source, the ruled grating, and the lens around a horizontal and vertical axis so that the light pattern can be cast in a desired target region. It is disadvantageous, however, that a filter wheel only has limited space for receiving further ruled gratings. This significantly limits the provision of further ruled gratings for generating different light patterns. A light pattern cast in the environment with the device disclosed in the document additionally only has a comparatively low focus depth, meaning that it is only possible to obtain a comparatively low precision when acquiring depth information in areas of the environment lying far ahead of the vehicle.

Exemplary embodiments of the present invention are directed to an improved micro-lens array projection device for generating light patterns that improves a precision of an active triangulation-based environment recording system, wherein the precision additionally remains unaffected by a current driving situation.

For a micro-lens array projection device of the kind specified in the introduction, according to the invention, the pattern template is formed by a microslide array comprising at least two microslides, wherein at least one microslide can be moved by at least one actuator in a plane located perpendicular to an optical axis between the field lens array and the projection lens array.

Using the micro-lens array projection device, a light pattern is generated with a comparatively high focus depth. The microslide array enables the provision of a comparatively high number of different microslides, which in turn allow individual light patterns to be generated. The microslides can additionally be moved in the plane, whereby a desired light pattern can be cast in a desired environment region. This allows the light pattern to be individually adjusted to a current environment situation. By moving the microslide or the microslides in a particular environment region, a desired design of the light pattern can thus be generated. As in the prior art, the light pattern can comprise a line pattern, strip pattern, dot pattern, grid pattern, chessboard pattern, a pseudo-random pattern, or similar. Thus, for example, a line or dot density in a particular environment region can be increased or decreased in a targeted manner. An orientation e.g., of lines can also be correspondingly adjusted by moving the microslides. For example, the microslides can be moved in the plane via a rotation and/or translation.

The micro-lens array projection device can have standard lighting means, such as at least one LED, OLED, laser, and/or a bulb such as a halogen, filament, or gas discharge lamp as a light source.

It is not necessarily required for the field lens array and the projection lens array to have the same cross-sectional surface area in the light beam path as the microslide array to generate the light pattern using the microslide array. It is thus sufficient if the microslide array has a smaller cross-sectional surface area than the two lens arrays. In other words, more field lenses and projection lenses can be provided than there are microslides comprised in the microslide array. This enables unobstructed light propagation via a pairing of a field lens and a projection lens if there is no microslide arranged between the lenses. If a microslide is now moved between the lenses, the light pattern generated via the microslide is cast in the environment region assigned to the pairing of the corresponding field and projection lens. The number of field lenses and projection lenses can generally also correspond to the number of microslides, however. Now, if the microslides are moved, individual microslides can be moved out of a lens pairing. For example, a recess is moved into the lens pairing to enable unobstructed light propagation via the lens pairing. There can also be more microslides provided than there are lens pairings present. The light pattern generated by a lens pairing and a specific microslide can thus be changed by a different microslide being moved in.

An advantageous development of the micro-lens array projection device provides that at least two microslides can be moved in intersecting rows and columns, in particular located perpendicular to one another. An arrangement of the microslides in rows and columns enables the microslides to be movable particularly flexibly and simply.

Corresponding to a further advantageous embodiment of the micro-lens array projection device, the at least one actuator is equipped to move, in particular to move translationally, at least two rows and/or columns simultaneously. A structure of the micro-lens array projection device according to the invention can thus be simplified. Fewer actuators are thus required to move a plurality of different rows and/or columns, whereby costs can be saved. For this purpose, for example, one actuator can be connected to several rows and/or columns simultaneously. For example, the microslides can be arranged in a segmented or non-segmented strip, which can be translationally shifted by the actuator within the microslide array. It is also possible for individual strips, depending on their travel, to be pushed at least partially out of the microslide array and/or a cross-sectional region of the plane assigned to the field lens array and the projection lens array. The actuator can be directly or indirectly connected to at least one microslide or to a corresponding strip. By shifting the microslide in the plane, an assignment of a corresponding microslide to respective field lenses and projection lenses of the field lens array and the projection lens array is altered. Thus, for example, a particular combination of a field lens and a projection lens can be focused on a particular environment region. By moving a desired microslide between the corresponding field lens and the corresponding projection lens, the light pattern that can be generated by the corresponding microslide can then be cast in the desired environment region as previously specified. In general, it is also conceivable that different pairings of a field and a projection lens can be directed at the same environment region but have a different focus, distort a light pattern generated by a microslide to a different extent, and/or manipulate it in another way, for example dim or polarize its luminosity to a different extent.

A further advantageous embodiment of the micro-lens array projection device further provides that at least one actuator is designed as a piezo actuator. A structure of the micro-lens array projection device can thus be simplified and costs can be reduced. Piezo actuators are additionally particularly resistant to vibrations, which enables a robust operation of the micro-lens array projection device in an environment affected by vibration. A reliability of the micro-lens array projection device according to the invention can thus be improved.

Corresponding to a further advantageous embodiment of the micro-lens array projection device, the light source comprises a lighting means equipped to emit light having at least one wavelength assigned to the infra-red spectrum. The lighting means can emit both monochromatic light having a fixed wavelength and several wavelengths simultaneously. A wavelength can be assigned to the infra-red spectrum and at least one further wavelength can, for example, be assigned to the visible light. All the wavelengths able to be generated by the lighting means can also come from the infra-red spectrum, however. A light pattern invisible to humans can thus be generated, whereby people cannot be disturbed and/or blinded. The risk of the light pattern being overpowered by ambient light is thus additionally reduced. The light pattern can thus be more easily recorded by a camera system. In a use of a light pattern generated using the micro-lens array projection device according to the invention in an environment recording system to determine depth information on the basis of active triangulation, an entire system can additionally be simplified, as the light pattern can be permanently, i.e., continuously projected in the environment, whereby no synchronization between camera and light source is required to make the light pattern visible in camera images generated by the camera. As in the prior art specified in the introduction, such synchronization is necessary for example when using a light source that emits visible light.

The microslides preferably respectively comprise a pattern of transparent and opaque portions for light emitted by the light source, wherein at least two microslides have a different pattern to each other. To light up an environment in a targeted manner, a pre-determined microslide can move between a particular combination of a field lens and a projection lens on the one hand, wherein different field lens and projection lens pairs for example cast the light pattern generated by the microslide in different environment regions and/or distort and/or focus said light pattern to different extents. If the individual microslides of the microslide array additionally comprise different patterns, the environment can be lit up in a more targeted manner depending on a current driving situation. Thus, for example, a line or dot density in a particular environment region can be increased or decreased in a targeted manner. An orientation of individual components of a pattern can thus be changed and/or the entire or individual portions of the light pattern cast in the environment can be exchanged.

According to the invention, a lighting device comprises at least one micro-lens array projection device described in the above. The lighting device can have further components such as reflectors, mirrors, control elements, filters or similar.

According to the invention, a vehicle has such a lighting device. The vehicle can be any vehicle, such as a passenger car, heavy goods vehicle, transporter, bus, or similar. The lighting device can, for example, be integrated into at least one front headlight and/or at least one rear light of the vehicle or be designed as the aforementioned. This allows a light pattern cast in an environment using a micro-lens array projection device according to the invention to be emitted both in a front region of the vehicle and in a rear region of the vehicle. The vehicle can also be controlled in a manner that is at least partially automated. Depth information acquired using the light pattern cast in the environment with the micro-lens array projection device according to the invention can serve as an input value for driver assistance systems, e.g., an active chassis and/or a system for carrying out control interventions in a longitudinal and/or transverse control of the vehicle.

According to the invention, a lighting device described above is used in an environment recording system of a vehicle to determine a road condition of a road driven along by the vehicle, in particular of a road lying ahead of the vehicle in a direction of travel.

The road condition is preferably determined on the basis of active triangulation. Such an environment recording system typically comprises at least one lighting device for generating a light pattern that is cast on the road driven along by the vehicle, at least one camera for generating camera images of the light pattern, wherein the camera is arranged at a vertical and/or horizontal spacing from the lighting device on the vehicle, and a computer unit for evaluating the camera images and/or outputting control signals to control the lighting device so that said lighting device adjusts the light pattern to a current driving situation. If, for example, the vehicle is approaching a bend, the emission of the light pattern needs to be adjusted, as the light pattern does not otherwise match the road running around the bend. For example, a course of the bend can be determined from an analysis of the camera images generated by the camera. The computer unit can then emit a control signal to control the actuators that then moves at least one microslide in the plane between the field lens array and the projection lens array. The light pattern can then be cast on the road extending around the bend, for example to condition an active chassis to rises and falls present on the bend to enable a comfortable driving feel for a person driving the vehicle of the vehicle. Because the environment is actively lit up, the condition of the road can thus also be recorded in darkness. Thanks to the comparatively high focus depth that can be generated in combination with micro-lens array projectors, there is also less degradation of the recording precision with increasing distance from the vehicle.

Further advantageous embodiments of the micro-lens array projection device according to the invention, the lighting device, the vehicle and a use of the lighting device in an environment recording system of the vehicle to determine a road condition of a road driven over by the vehicle result from the exemplary embodiments, which are described in more detail in the following with reference to the figures.

BRIEF DESCRIPTION OF THE DRAWING FIGURES

Here:

DETAILED DESCRIPTION

Figure 1:
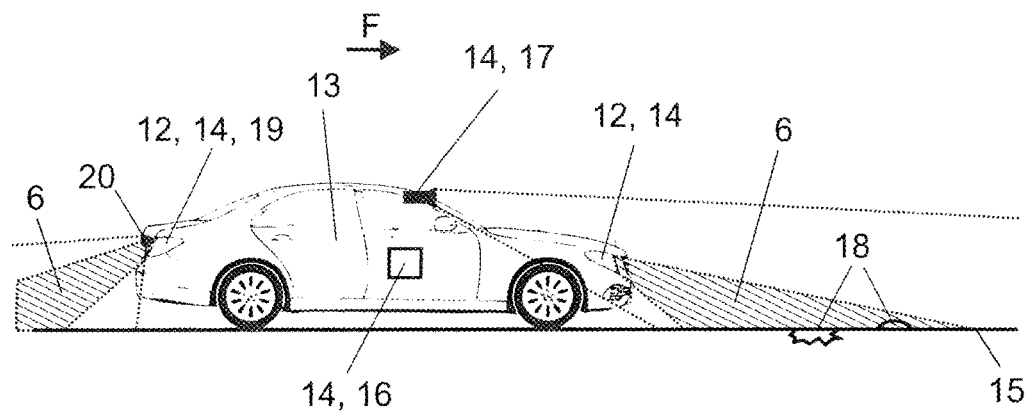
FIG. 1 shows a schematic depiction of an active triangulation-based environment recording system.
Figure 2:
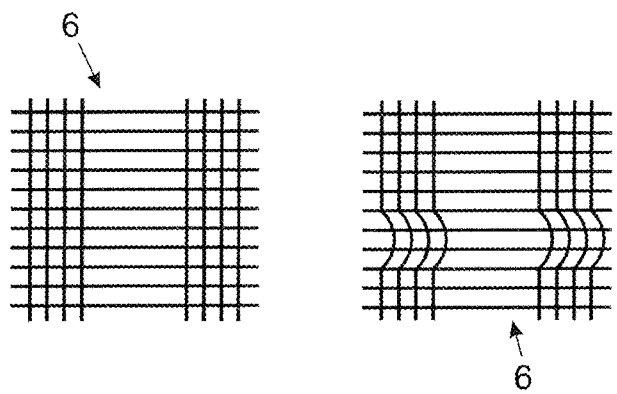
FIG. 2 shows an exemplary light pattern cast on a road which will shortly be driven over by a vehicle.

FIG. 1 shows a use of an active triangulation-based environment recording system 14 of a vehicle 13, here in the form of a passenger car. The environment recording system 14 comprises at least one lighting device 12 according to the invention, a computer unit 16 and a camera 17. The lighting device 12 has at least one micro-lens array projection device 1 according to the invention in turn or is designed as the latter. The lighting device 12 can, in particular, be integrated into a vehicle headlight or be designed as the headlight itself. Using the lighting device 12, a light pattern 6 shown in more detail in FIG. 2 is cast on a road 15 lying ahead of the vehicle 13 in a direction of travel F. The light pattern 6 is recorded using the camera 17. The light pattern 6 is distorted by structures 18 such as potholes or bumps located on the road 15. The camera 17 has a vertical and/or horizontal offset from the lighting device 12 that is as large as possible so that it can record the distorted light pattern 6 cast on the road 15 in a manner that is as undisturbed as possible. Camera images generated by the camera 17 are evaluated in the computer unit 16. An investigation is made of the extent to which the light pattern 6 has been distorted by the structures 18. By analyzing an extent of the distortion of the light pattern 6, depth information can be acquired so that a judgement can be made with regard to a road condition of the road 15.

In general, it is also conceivable that the vehicle 13 has a lighting device 12 pointing rearwards in the opposite direction to the direction of travel F, for example in a rear light 19. Similarly, the vehicle 13 has a rear-view reversing camera 20 to record the light pattern 6 cast rearwards.

The depth information or road condition calculated by the computer unit 16 can then be used in turn as an input value for driver assistance systems, for example an adaptive chassis.

FIG. 2 shows the exemplary light pattern 6 in an aerial view. In FIG. 2, the light pattern 6 is designed as a line pattern. In general, however, the light pattern 6 can have any conceivable configuration. For example, it can also be a strip pattern, dot pattern, grid pattern, chessboard pattern, and/or a pseudo-random pattern. In the embodiment shown here, the light pattern 6 has horizontal and vertical lines, wherein the vertical lines coincide in particular with a lane that will be driven over in future by wheels of the vehicle 13. In the left-hand half of FIG. 2, an undistorted light pattern 6 is shown. In the right-hand half of FIG. 2, the light pattern 6 is distorted by a bump, here in the form of a speed bump. The light pattern is, in particular, designed such that a higher content density of pattern contents, here the vertical strips, is achieved for particular environment regions in which the light pattern 6 is cast that coincide with a trajectory of lanes of the vehicle 13.

Figure 3:
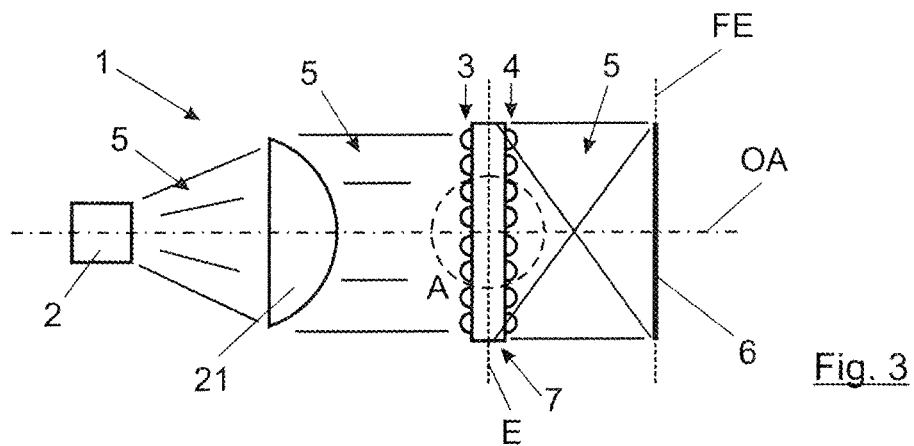
FIG. 3 shows a schematic depiction of a micro-lens array projection device according to the invention.

FIG. 3 shows a schematic depiction of the micro-lens array projection device 1 according to the invention. The device comprises a light source 2, for example having a lighting means in the form of an LED, OLED, a laser, a halogen lamp, or similar. Arranged downstream in a light beam path 5 of the light source 2 there is an optional lens 21. The lens 21 can be designed in any way. For example, the lens 21 can have at least one plane, convex, or concave side.

After the lens 21, the light hits a field lens array 3 comprising a plurality of field lenses. In particular, the field lenses are arranged orthogonally in a two-dimensional matrix formed from rows Z and columns S shown in more detail in FIG. 5 using the example of a microslide array 7.

A microslide array 7 is connected to the field lens array 3. The microslide array 7 comprises a plurality of microslides 8 that have in turn a pattern 10 of transparent 11.1 and opaque portions 11.2 for the light emitted by the light source 2. The portions 11.1 and 11.2 are depicted in more detail in FIG. 5. Using the microslides 8 or the pattern 10 comprised by the microslides 8, the light pattern 6 can be generated from the light emitted by the light source 2.

A projection lens array 4 is connected to the microslide array 7. The microslides 8 can be moved within a plane E located orthogonally to an optical axis OA. By moving the microslides 8, the light pattern 6 can be changed.

The light pattern 6 is in turn incident in a focal plane FE on a reflection plane (not depicted), for example on the road 15. The focal plane FE does not necessarily have to be oriented in parallel to the plane E as depicted in FIG. 3. In particular, the micro-lens array projection device 1 according to the invention is designed such that a light pattern 6 cast on a road 15 as in FIG. 1 appears sharply in focus on the road 15 along its complete projection. For this purpose, the individual field and projection lenses of the field lens array 3 and of the projection lens array 4 can have different focal points to one another. In particular, a pre-determined microslide 8 is assigned to a fixed pairing of a field lens and a projection lens. By moving the microslide 8 in the plane E, this assignment can be changed.

In particular, the light source 2 can be designed to emit infra-red light. Infra-red light has the advantage that it cannot be perceived by humans, whereby people cannot be disturbed and/or distracted by the light pattern 6. In addition, the light pattern 6 is hardly or not at all damaged by ambient light reflected from the environment.

The micro-lens array projection device 1 according to the invention can additionally have further components (not shown), such as additional lenses, filters, reflectors, mirrors, cooling bodies, control devices, or the like.

Figure 4:
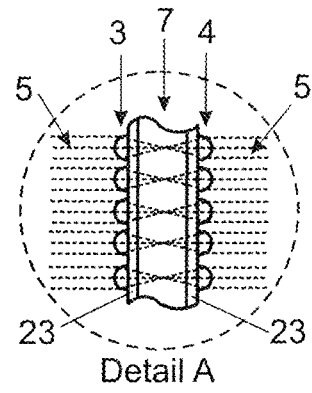
FIG. 4 shows a detailed view of an arrangement, depicted in FIG. 3, of a field lens array, a microslide array and a projection lens array.
Figure 5:
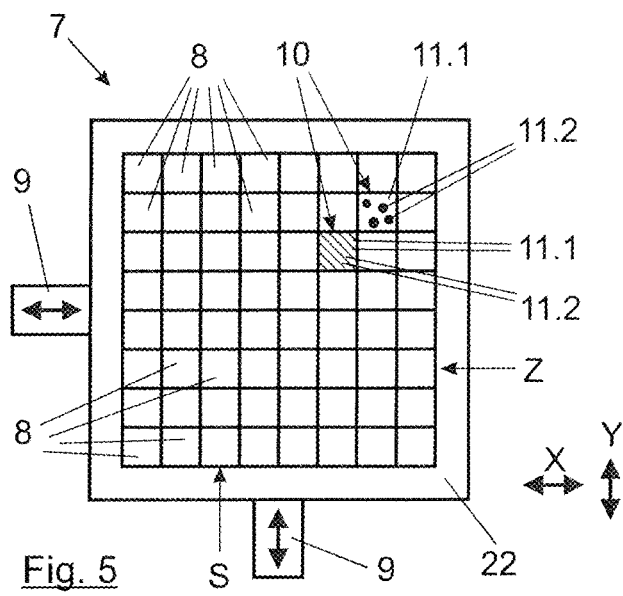
FIG. 5 shows an aerial view of the microslide array from the direction of an optical axis.

FIG. 3 additionally comprises a detail A that is shown in more detail in FIG. 4. The microslide array 7 can, as shown in FIG. 5, for example have a frame 22 that is completely closed or open on at least one side. A substrate 23 on which the field lenses and projection lenses are arranged is located on the frame 22. It is also conceivable that the frame 22 forms the substrate 23 or the field lenses and/or projection lenses abut in any manner directly or indirectly on the microslide array 7.

FIG. 5 shows an aerial view of the microslide array 7 from the direction of the optical axis OA. In the embodiment in FIG. 5, the microslides 8 are arranged in rows Z and columns S, here located orthogonally to one another. In general, the rows Z and columns S can also intersect with one another at any angle, for example at an angle of 60°. The micro-lens array projection device 1 or the microslide array 7 can comprise at least one actuator 9 for moving the microslides 8. The actuator 9 can be connected to the frame 22 or, for example, protrude through a side opening of the frame 22 and be connected to at least one microslide 8 and/or a superordinate structure suitable for receiving the microslide 8, for example a strip 24 shown in FIG. 6. The actuator 9 can in particular be a piezo actuator. The actuator 9 can, for example, execute a translational stroke to move the microslides 8 in an x or y direction. It is particularly advantageous if microslides 8 can be moved in at least two rows Z and/or columns S simultaneously using an actuator 9. A number of actuators 9 required can thus be reduced, which simplifies the structure of the micro-lens array projection device 1 according to the invention, whereby costs can be saved in turn. In general, it is also conceivable that at least one of the rows Z and/or columns S of the microslide array 7 is respectively designed to be immovable.

A plurality of individual microslides 8 is arranged within a row Z and/or a column S of the microslide array 7. The microslides 8 can have different patterns 10 of at least one transparent 11.1 and opaque portion 11.2 for light emitted by the light source 2. In the example in FIG. 5, only two exemplary patterns 10 for two microslides 8 are shown. Several microslides 8 can also have the same pattern 10.

Figure 6:
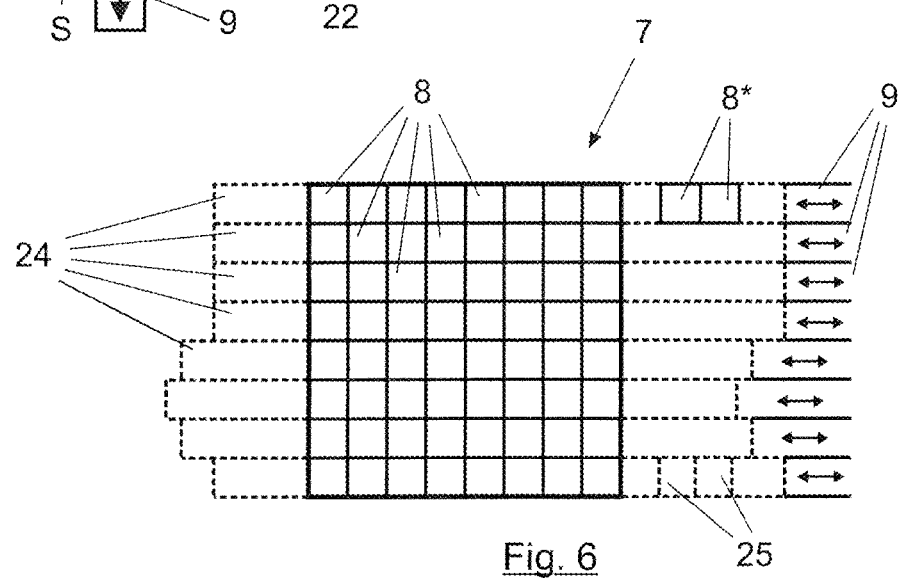
FIG. 6 shows an aerial view of an alternative microslide array from the direction of the optical axis.

As FIG. 6 shows, a movement of the columns S or, as depicted, a movement of the rows Z can only occur along one of the directions x or y. In FIG. 6, the individual microslides 8 are arranged in the form of strips 24, wherein the strips 24 can be moved along the x direction. A translational movement of individual or of all the microslides 8 in the y direction is not possible in the example in FIG. 6. This further simplifies the structure of the microslide array 7. The individual actuators 9 can move the strips 24 so far that a microslide 8 arranged in any horizontal position in the microslide array 7 can be moved to any other horizontal position. To that end, the actuator 9 can be directly or indirectly connected to a strip 24 or to a microslide 8.

The strips 24 can also be segmented such that a translational shift of the microslides 8 both in the x and y direction is enabled (not depicted). Furthermore, at least one strip 24 can also have further microslides 8* and/or also have recesses 25 so that it can generate alternative light patterns 6 and/or to enable unobstructed light propagation. A strip 24 itself can also function as an "aperture" as the strip 24 prevents uninterrupted light propagation via a lens pairing.

Figure 7:
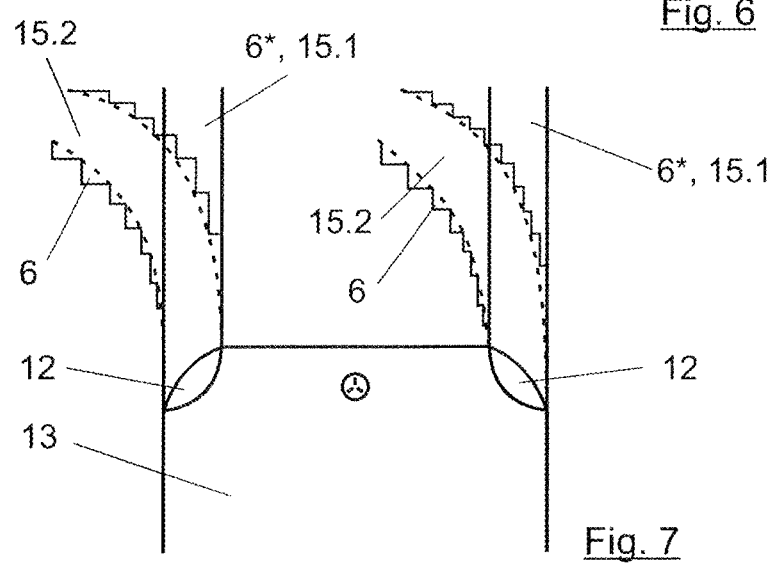
FIG. 7 shows a schematic depiction of an adjustment of the light pattern cast on the road depending on a changing driving situation.

FIG. 7 shows an aerial view of a typical driving situation of the vehicle 13. Only a rigid light pattern 6* that can be cast on a straight road 15.1 depicted by solid lines can be generated using a micro-lens array projection device known from the prior art. If the road 15.2 runs around a bend, however, as depicted by the dashed lines, a relevant region of the road would not be sufficiently lit. Using the micro-lens array projection device 1 according to the invention and the corresponding lighting device 12, however, the light pattern 6 can be changed such that it coincides with the bending road 15.2. This allows the road 15 actually being driven over by the vehicle 13 to be ideally lit. It is thus possible to adjust the light pattern 6 to a current driving situation. In addition to flexibly adjusting the light pattern 6 to different road and/or driving dynamics situations, the micro-lens array projection device 1 according to the invention thus enables the road 15 to be particularly reliably recorded even in darkness and at any distance of the light pattern 6 from the vehicle 13 thanks to the high focus depth of the light pattern 6 that can be generated when micro-lens array projectors are used. Degradation of recording precision thus decreases with increasing distance from the vehicle 13. Due to a use of an infra-red light source, a corresponding environment recording system 14 is additionally robust with regard to ambient light and has low complexity.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A micro-lens array projection device, comprising:
   at least one light source;
   a field lens array;
   a projection lens array; and
   a pattern template arranged between the field lens array and the projection lens array in a light beam path coming from the at least one light source,
   wherein the pattern template is configured to generate a light pattern from light emitted by the at least one light source, and
   wherein the pattern template is a microslide array comprising at least two microslides, wherein at least one microslide of the at least two microslides is movable by at least one actuator in a plane located perpendicular to an optical axis between the field lens array and the projection lens array.

2. The micro-lens array projection device of claim 1, wherein the at least two microslides are movable, perpendicular to one another, in intersecting rows and columns.

3. The micro-lens array projection device of claim 1, wherein the at least one actuator is configured to translationally move at least two rows or at least columns of the at least two microslides simultaneously.

4. The micro-lens array projection device of claim 1, wherein the at least one actuator is a piezo actuator.

5. The micro-lens array projection device of claim 1, wherein the at least one light source comprises lighting configured to emit light with at least one wavelength assigned to infra-red spectrum.

6. The micro-lens array projection device of claim 1, wherein the at least two microslides respectively comprise a pattern of transparent and opaque portions for light emitted by the light source, wherein the at least two microslides have a different pattern from each other.

7. A vehicle, comprising:
   a lighting device comprising at least one micro-lens array projection device, which comprises
   at least one light source;
   a field lens array;
   a projection lens array; and
   a pattern template arranged between the field lens array and the projection lens array in a light beam path coming from the at least one light source,
   wherein the pattern template is configured to generate a light pattern from light emitted by the at least one light source, and
   wherein the pattern template is a microslide array comprising at least two microslides, wherein at least one microslide of the at least two microslides is movable by at least one actuator in a plane located perpendicular to an optical axis between the field lens array and the projection lens array.

8. A method comprising:
   providing a micro-lens array projection device, comprising at least one light source, a field lens array, a projection lens array, and a pattern template arranged between the field lens array and the projection lens array in a light beam path coming from the at least one light source, wherein the pattern template is configured to generate a light pattern from light emitted by the at least one light source, and wherein the pattern template is a microslide array comprising at least two microslides, wherein at least one microslide of the at least two microslides is movable by at least one actuator in a plane located perpendicular to an optical axis between the field lens array and the projection lens array;

moving the at least one microslide in the plane located perpendicular to the optical axis between the field lens array and the projection lens array; and generating, by the pattern template from the light emitted by the at least one light source, the light pattern.

\* \* \* \* \*